United States Patent [19]

Rodriguez

[11] 4,374,453

[45] Feb. 22, 1983

[54] BICYCLE FREEWHEEL WRENCH PRY ADAPTER

[76] Inventor: Angel L. Rodriguez, 5627 University Way NE., Seattle, Wash. 98105

[21] Appl. No.: 228,014

[22] Filed: Jan. 23, 1981

[51] Int. Cl.³ .............................................. B23P 19/00

[52] U.S. Cl. .................................... 29/426.5; 29/283; 81/90 C; 411/435

[58] Field of Search .............. 29/283, 426.5; 81/90 R, 81/90 C, 121 A, 177 A; 411/435

[56] References Cited

U.S. PATENT DOCUMENTS

| | | | |
|---|---|---|---|
| 874,543 | 12/1907 | Scheuer | 81/90 C |
| 1,263,202 | 4/1918 | Brown | 81/90 C |
| 2,553,813 | 5/1951 | Dobrick | 411/435 |
| 2,968,206 | 1/1961 | Omoto | 411/435 |
| 3,319,509 | 5/1967 | Romeo | 411/435 |
| 4,059,033 | 11/1977 | Johnson | 81/90 C |

*Primary Examiner*—James L. Jones, Jr.
*Attorney, Agent, or Firm*—Robert W. Beach; Douglas E. Winters; Ward Brown

[57] ABSTRACT

A bicycle freewheel wrench pry adapter for use with a freewheel wrench in removing a freewheel and its associated drive sprocket assembly from the bicycle axle is generally U-shaped and includes a channel in the base of the U opposite the legs of the U which fits the boss of the freewheel wrench engaged with the freewheel. The adapter includes a recess in the root of each leg of the U to assist in retaining a pry inserted between the legs for applying force through the freewheel wrench to the freewheel. The freewheel wrench pry adapter channel includes stress reliefs in the corners of the channel to avoid excessive stress concentrations in such corners which could induce breakage of the freewheel wrench pry adapter.

6 Claims, 6 Drawing Figures

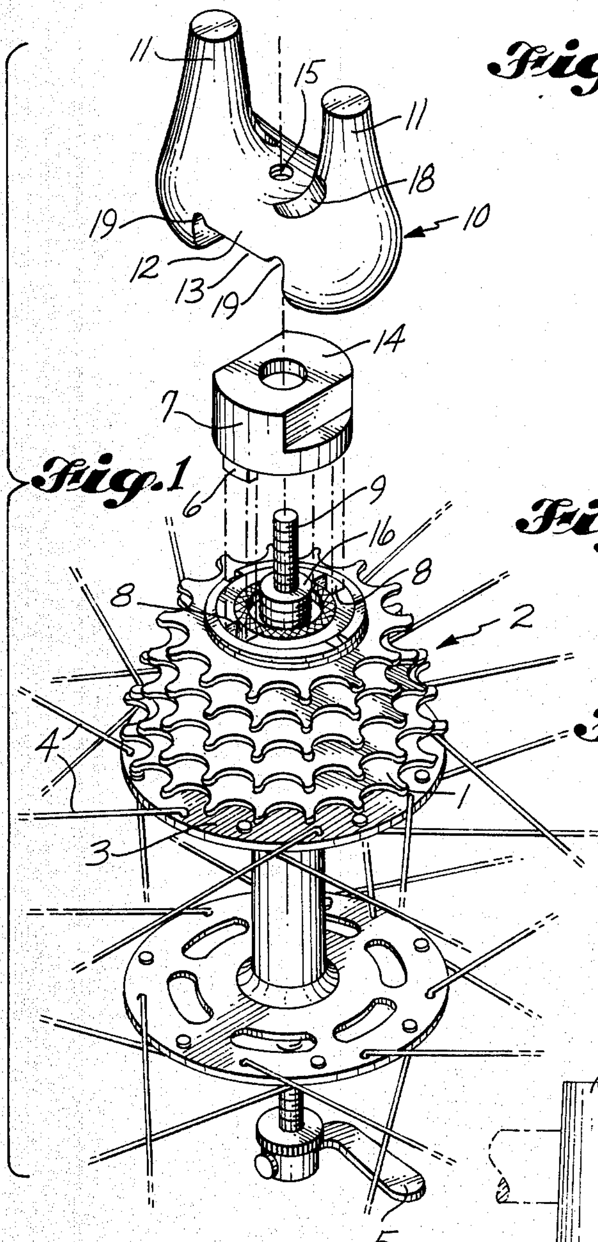
Fig. 1
Fig. 2
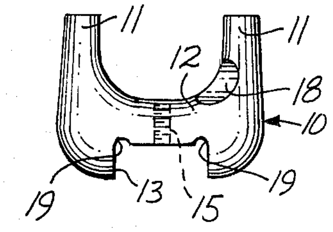
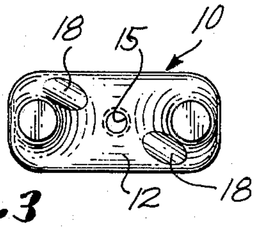
Fig. 3
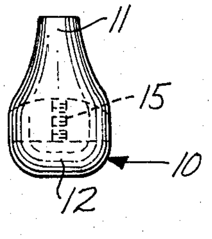
Fig. 4
Fig. 5
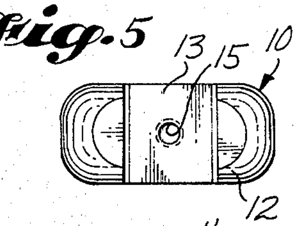
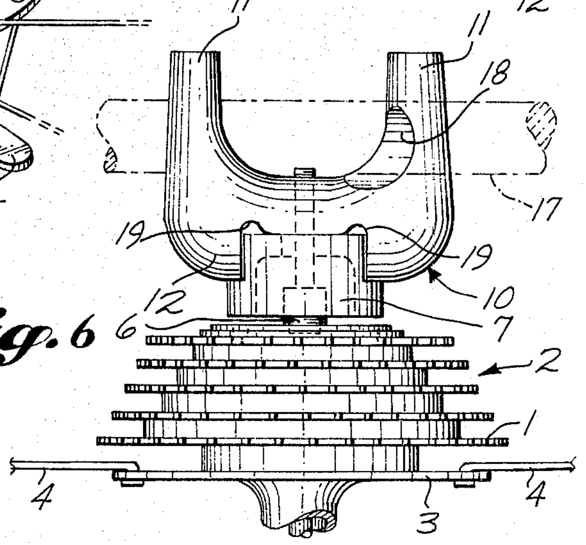
Fig. 6

BICYCLE FREEWHEEL WRENCH PRY ADAPTER

BACKGROUND OF THE INVENTION

1. Field of the Invention

The present invention relates to a bicycle freewheel wrench pry adapter and more particularly to a compact, portable device for removing a bicycle freewheel at a location remote from a repair shop.

2. Prior Art

One of the most common repairs which must be made on a bicycle is the replacement of a broken spoke. Due to the transmission of forces between freewheel and the bicycle wheel, the spokes which break most frequently are those on the drive sprocket side of the rear wheel. However, since typically the low gear sprocket of the freewheel extends over the hub flange in which the inner ends of such spokes are anchored, it is virtually impossible to replace these spokes unless the freewheel and drive sprockets are removed.

Presently when it is desired to remove a bicycle freewheel, a special lugged freewheel wrench is inserted over the bicycle wheel axle with its lugs engaging the bezels in the freewheel. Then the freewheel is rotated relative to the bicycle wheel by either holding the wheel stationary and applying a rotational force to the freewheel wrench with a large monkey wrench, pipe wrench, adjustable end wrench or spanner, or holding the freewheel wrench stationary in a vise and rotating the bicycle wheel.

Due to the weight and bulk of the 13-inch (33 cm) spanner or equivalent wrench or vise which is needed to grip the freewheel wrench in removing the freewheel, the touring cyclist will not normally carry such a wrench or vise and therefore is unable to remove the freewheel and associated sprockets, even if he has the light small freewheel wrench itself, and is therefore unable to change a spoke adjacent to the wheel drive sprockets. As a result, upon breaking such a spoke, the cyclist may need to push his bicycle several miles before obtaining assistance, or risk breaking more spokes.

SUMMARY OF THE INVENTION

It is an object of the present invention to provide a means for enabling a touring cyclist to remove the bicycle freewheel and drive sprockets without the necessity of carrying a large wrench or vise.

A more specific object is to provide a compact and lightweight bicycle freewheel wrench pry adapter which may be carried easily by a cyclist.

Another object is to provide such a bicycle freewheel wrench pry adapter which is economical and easy to manufacture.

A further object is to provide such a bicycle freewheel wrench pry adapter which may be used easily and quickly by an unskilled person.

The foregoing objects can be accomplished by a generally U-shaped bicycle freewheel wrench pry adapter which has a threaded bore extending centrally through the base of the U and a generally rectangular channel which is opposite the legs of the U formed as spaced posts projecting perpendicularly from the base of the U. Such channel receives and its flanges fit the boss of a special freewheel removing wrench. The channel corners can have stress reliefs. The legs are engageable by any of a variety of pries for applying a rotational force to the pry adapter for turning the freewheel wrench to remove the freewheel. Recesses, one at the root of each leg can deter a pry from slipping off the posts.

BRIEF DESCRIPTION OF THE DRAWINGS

FIG. 1 is an exploded top perspective of a freewheeling bicycle hub, a special freewheel wrench and the bicycle freewheel wrench pry adapter of the present invention, the quick-release nut having been removed and parts being broken away.

FIG. 2 is a side elevation of the freewheel wrench pry adapter.

FIG. 3 is a top plan,

FIG. 4 is an edge elevation, and

FIG. 5 is a bottom plan of the pry adapter.

FIG. 6 is a side elevation of a freewheeling bicycle hub with the quick-release nut removed and a freewheel wrench and a pry adapter in place to remove the freewheel, a fragment of a representative pry being shown in phantom lines.

DETAILED DESCRIPTION

Since, as shown in FIG. 6, the low speed sprocket 1 of multiple drive sprocket freewheel 2 is of greater diameter than the circle of spoke-end-receiving holes in hub flange 3 in most freewheeling bicycles, access to the end portions of spokes 4 adjacent to such hub flange is hindered. To remove the end portion of a broken spoke 4, the freewheel 2 and drive sprocket assembly must be removed. In the past this has been done by releasing the quick-release lever 5 (shown in FIG. 1), removing the wheel from the bicycle frame, removing the quick-release nut (not shown), engaging the lugs 6 of the special freewheel wrench 7 in the bezels 8 of the freewheel 2, and replacing the quick-release nut onto the quick-release rod 9 to keep the lugs of the freewheel wrench 7 engaged in the freewheel 2. Then a powerful counterclockwise force was applied to the freewheel wrench 7 with a large wrench, such as a monkey wrench, a pipe wrench, an adjustable or open end wrench or a spanner, while keeping the bicycle wheel stationary, or by clamping the boss of the freewheel wrench 7 in a stationary vise and rotating the bicycle wheel.

Obviously a touring cyclist will not carry with him a vise and seldom, if ever, will he carry a spanner or a wrench sufficiently large to grip the freewheel wrench boss for loosening and removing the freewheel 2. To obtain enough leverage to loosen the freewheel 2, the wrench must preferably be at least 13 inches (33 cm) in length. A spanner or wrench of such size is too bulky and heavy to be carried conveniently on a touring bicycle trip.

The present invention eliminates the need for a vice or large wrench to remove a freewheel and associated drive sprocket assembly by providing a compact and lightweight pry adapter 10 for the freewheel wrench 7 which will enable any of a variety of pries to be used to turn the freewheel wrench. As shown in FIG. 2, the pry adapter 10 is generally U-shaped with two parallel legs 11 projecting perpendicularly from one side of an elongated base 12 and spaced apart lengthwise of such base. A generally rectangular channel 13 is cut in the opposite side of the base, having parallel flanges extending perpendicular to the length of the base. The width of the channel is the same as the width of the boss 14 of the freewheel wrench 7, and the channel depth may be the same as the height of such boss.

To remove the freewheel 2 using the freewheel wrench pry adapter 10 of the present invention, the quick-release nut is removed and the lugs of the freewheel wrench 7 are engaged in the bezels 8 of the freewheel 2 in the normal fashion. Then, instead of replacing the quick-release nut by threading it onto the quick-release rod 9, the freewheel wrench pry adapter 10 is threaded onto the quick-release rod 9 by means of the threaded bore 15 extending through the central portion of the adapter base 12. Since the quick-release rod 9 is free to rotate and slide within the axle 16, the freewheel wrench pry adapter 10 is most easily engaged with the wrench 7 by aligning the channel 13 with the freewheel wrench boss 14 and rotating the quick-release rod 9 by means of the quick-release lever 5.

Then to remove the freewheel 2 from the axle 16, the legs 11 of the pry adapter can be engaged in an immovable slot, such as between bars of a storm drain grating, and applying a counterclockwise force to the bicycle wheel. Alternatively, the bicycle wheel can be held stationary while a counterclockwise force is applied to the freewheel wrench 9 by engaging a bar or any other suitable pry 17 between the legs or posts 11 of the freewheel wrench pry adapter 10 and applying a counterclockwise rotational force to the freewheel 2. To deter the bar 17 from riding up the posts 11 of the freewheel wrench pry adapter 10, a recess 18 can be provided in the root of each leg 11, as best shown in FIG. 3. Since the freewheel 2 is self-tightening as the bicycle is ridden, it is not necessary to use the freewheel wrench 7 to replace the freewheel 2 onto the axle 16 and, therefore, it is unnecessary to provide a second recess in the opposite side of the root of each post 11.

Owing to the self-tightening action of the freewheel 2, the force required to break the freewheel 2 free of the axle 16 can be great, and the stress concentration at the corners of the channel 13 can be enough to break the freewheel wrench pry adapter 10. Therefore, a stress relief 19 is formed in each of the corners of the channel 13 to avoid excessive stress concentrations in such corners.

I claim:

1. A bicycle freewheel wrench pry adapter for turning a bicycle freewheel wrench having a wrench-engageable boss with opposite parallel sides and a bore between such parallel boss sides with its axis parallel to such parallel boss sides and receiving a threaded quick-release rod of a bicycle wheel, said wrench pry adapter comprising a generally U-shaped device having a base with a threaded bore therethrough for screw engagement with the threaded bicycle wheel quick-release rod, a generally rectangular channel recess in one side of said base having parallel sides at opposite sides of said threaded bore and parallel to the axis of said threaded bore for engagement with the opposite parallel sides of the bicycle freewheel wrench boss, and generally parallel legs upstanding from the side of said base opposite said channel recess at opposite sides of said threaded bore and adapted for engagement of a pry with said legs for turning the wrench pry adapter to turn the bicycle freewheel wrench engaged by said base channel recess.

2. The adapter defined in claim 1, the channel recess having stress reliefs in its corners.

3. The adapter defined in claim 2, or 1, the root of each leg of the U having a recess, such recesses being at opposite sides of the legs and engageable by a pry for applying a rotational force for removing a bicycle freewheel.

4. The method of removing a bicycle freewheel from a bicycle wheel with a bicycle freewheel wrench having a wrench-engageable boss with opposite parallel sides and a bore between such parallel boss sides, the axis of which bore is parallel to such parallel boss sides, which method comprises fitting the bore of the bicycle freewheel wrench over a threaded quick-release rod of a bicycle wheel, screwing a threaded bore in the base of a generally U-shaped wrench pry adapter onto the threaded quick-release rod, engaging the parallel sides of a generally rectangular channel recess in one side of the base of the wrench pry adapter with the opposite parallel sides of the bicycle freewheel wrench boss, and applying a torque to generally parallel legs upstanding from the side of the base of the wrench pry adapter opposite the channel recess, which torque is transmitted by the wrench pry adapter to the wrench-engageable boss of the freewheel wrench and then to the bicycle freewheel.

5. The method defined in claim 4, including engaging a pry with the legs of the U-shaped wrench pry adapter and applying torque to the wrench pry adapter while maintaining the bicycle wheel stationary.

6. The method defined in claim 4, including maintaining the U-shaped wrench pry adapter stationary by engaging its legs in an immovable slot and applying a torque to the bicycle wheel.

* * * * *